No. 898,332.  
PATENTED SEPT. 8, 1908.  
H. N. DAVIS.  
FRICTION CLUTCH.  
APPLICATION FILED JAN. 18, 1908.
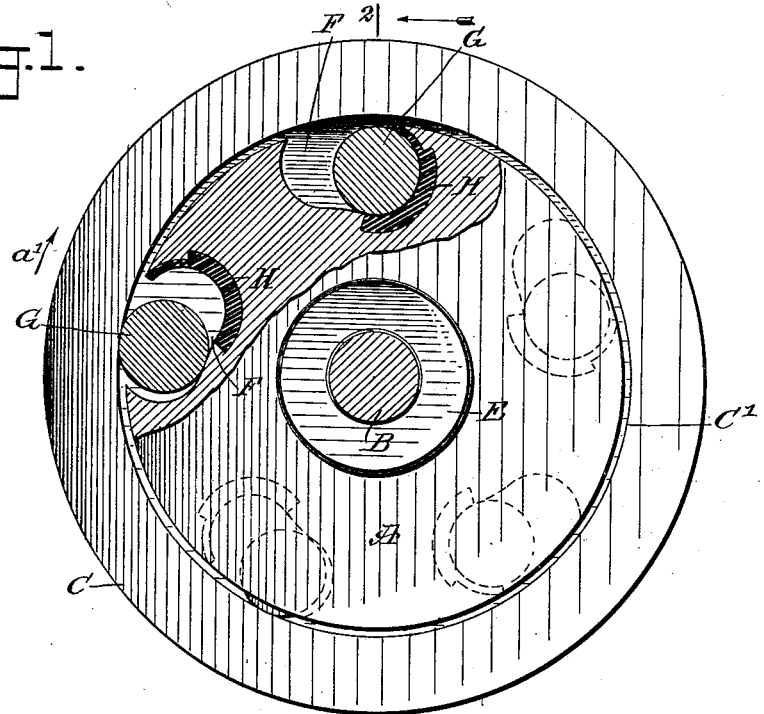
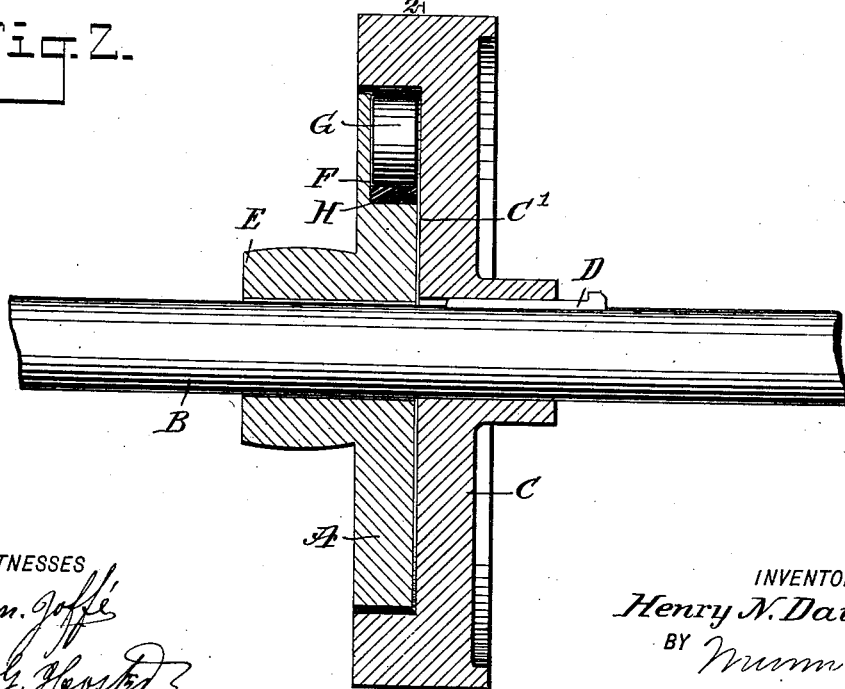
WITNESSES  
Ben. Joffe  
INVENTOR  
Henry N. Davis  
BY  
Munn & Co  
ATTORNEYS

UNITED STATES PATENT OFFICE.

HENRY NELSON DAVIS, OF INDEPENDENCE, MISSOURI.

FRICTION-CLUTCH.

No. 898,332.  Specification of Letters Patent.  Patented Sept. 8, 1908.

Application filed January 18, 1908. Serial No. 411,406.

*To all whom it may concern:*

Be it known that I, HENRY NELSON DAVIS, a citizen of the United States, and a resident of Independence, in the county of Jackson and State of Missouri, have invented a new and Improved Friction-Clutch, of which the following is a full, clear, and exact description.

The invention relates to clutches for transmitting intermittent rotary motion from a driving member to the member to be driven.

The object of the invention is to provide a new and improved friction clutch, which is simple and durable in construction, very effective and practically noiseless in operation, and arranged to automatically connect the driving member with the member to be driven, as long as the driving member rotates in a forward direction, and to immediately and automatically release the driven member as soon as the forward motion of the driving member ceases or the driving member runs in a reverse direction.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in both views.

Figure 1 is a side elevation of the improvement, parts being in section, and Fig. 2 is a transverse section of the same on the line 2—2 of Fig. 1.

The driving member A is mounted to rotate loosely on the shaft B, to be driven by the driven member C, fastened on the shaft B by the use of a key D or other fastening means. The driving member A is provided with a pulley E or other means for connecting the driving member A with the actuating machinery, to rotate the driving member. The driving member A fits into a recess C' formed in one face or side of the driven member C, and in the periphery of the driving member A are formed pockets F, each containing a roller G. The bottom of each pocket F is inclined in such a manner that when the driving member A is rotated in the direction of the arrow $a'$, then the rollers G travel up the inclined bottoms of the pockets F, to wedge between the pocket bottoms and the wall of the recess C'. Normally or when the driving member A is at rest or rotates in the inverse direction of the arrow $a'$, the rollers G are in the deep ends of the pockets F and are confined therein, so as to be out of engagement with the wall of the recess C'. The bottoms of the pockets F at the deepest portions thereof are lined with rubber linings H, which form cushions for the rollers G, to render the friction clutch noiseless.

It is understood that when the driving member A rotates in the direction of the arrow $a'$, the rollers G are thrown outward by centrifugal force, and in doing so travel up the inclined bottoms of the pockets F, to wedge between the said inclined bottoms and the wall of the recess C'. When this takes place the driven member C is carried along with the driving member A, and consequently the shaft B is rotated in the direction of the arrow $a'$. Now when the driving member A ceases to rotate, or is rotated in the inverse direction of the arrow $a'$, then the rollers G travel back into the deep portions of the pockets F, thus disengaging the wall of the recess C', whereby the members A and C are uncoupled.

It is expressly understood that the rollers G are carried along by the driving member A, to cause the rollers to travel in the elongated pockets F by centrifugal force, either towards the deepest portion or the shallowest portion, according to the direction in which the driving member A is rotated at the time.

Having thus described my invention, I claim as new and desire to secure by Letters Patent:

A friction clutch comprising a driving member having elongated pockets in its periphery, each pocket having an inclined bottom, and a cut-away portion at the deeper end of the pocket, said portion having a cushion of rubber secured therein, the outer face of the rubber being continuous with the surface of the pocket, a driven member having a recess in its face into which fits the driving member, and rollers in the pockets.

In testimony whereof I have signed my name to this specification in the presence of two subscribing witnesses.

HENRY NELSON DAVIS.

Witnesses:
G. F. CAMPBELL,
GEO. O. GOULD.